E. BECK.
SAW.
APPLICATION FILED OCT. 6, 1920.

1,384,884.

Patented July 19, 1921.

WITNESS:
C. L. Osgood
D. Lamburg

INVENTOR.
E. Beck
BY H. J. Sanders
ATTORNEY.

UNITED STATES PATENT OFFICE.

ERIC BECK, OF ABERDEEN, WASHINGTON.

SAW.

1,384,884.  Specification of Letters Patent.  Patented July 19, 1921.

Application filed October 6, 1920. Serial No. 414,990.

*To all whom it may concern:*

Be it known that I, ERIC BECK, a citizen of Finland, residing at Aberdeen, in the county of Grays Harbor and State of Washington, have invented certain new and useful Improvements in Saws, of which the following is a specification.

This invention relates to improvements in saws and its object is to provide a saw of the cross-cut type provided with oscillating raker teeth disposed between certain of the regulation saw teeth, the purpose of the raker teeth being to rake the saw dust from the cut in the work to facilitate the operation of the saw. To permit application of the raker teeth the blade of the saw is recessed and perforated in such manner as to enable it to receive the raker teeth and to provide clearance for operation of the same with relation to the regulation teeth.

More specifically the invention consists in the combination and arrangement of parts to be hereinafter fully described, pointed out in the appended claims and illustrated in the accompanying drawing which forms a part of this application and in which—

Like reference characters denote corresponding parts throughout the several views.

Figure 1:
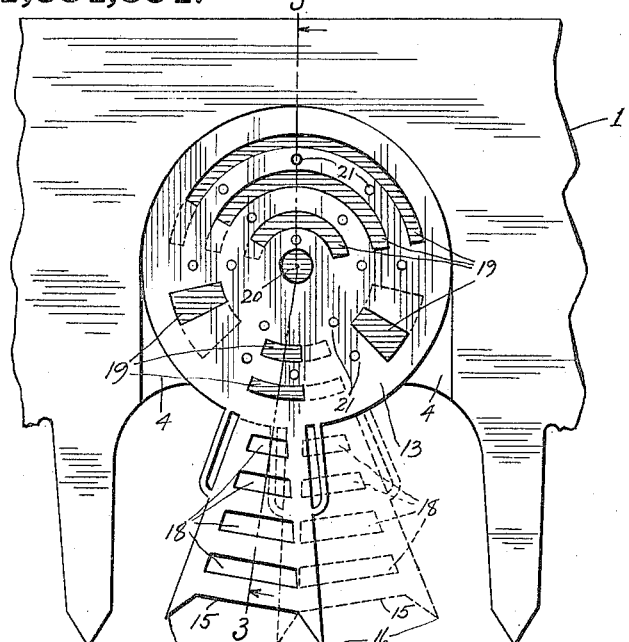
Figure 1 is a fragmentary view of a saw constructed according to my present invention and illustrating two positions of the raker tooth.
Figure 2:
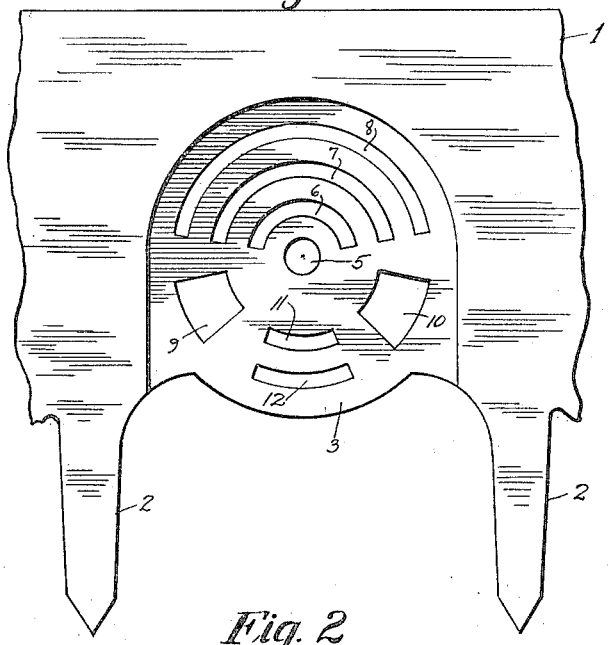
Fig. 2 is a fragmentary view of the saw blade with the raker tooth removed.

The reference numeral 1 denotes the saw blade provided with the usual teeth 2 and between certain of said teeth 2 I provide a raker tooth which is movable relatively to said teeth 2, the raker teeth being provided at predetermined intervals along the saw blade as desired. To permit the application and operation of the raker teeth the saw blade is formed with a plurality of opposed recesses 3 upon its lateral faces to receive the raker teeth. The recesses 3 are substantially of circular formation except for the recess portions 4 which lie outside the circle and provide clearance for placing the raker tooth in position, especially when the same is of one solid piece.

The recessed portions of the saw blade are formed with the central circular perforations 5, with the arcuate slots 6, 7, 8, concentric, but successively of greater radius, one than the other, said slots being each substantially of 160 degrees. Below the perforation 5 in the recess 3 I form the oppositely disposed arcuate slots 9, 10 of substantially 33 degrees and each of greater width than any of the slots 6, 7, 8; between the slots 9, 10 are the arcuate slots 11, 12, concentric, and the latter being of greater radius than the slot 11, said slots being of substantially 44 degrees each, all of the slots being described about the perforation 5 as a center.

Figure 3:
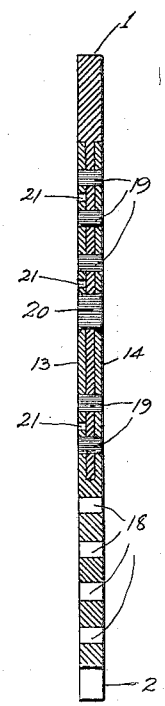
Fig. 3 is a section taken on line 3—3 of Fig. 1.

My raker tooth comprises the circular disks 13, 14, spaced apart and that may be integral or suitably secured together and that carry the depending tooth, proper, 15 formed with the oppositely disposed prongs 16, 17 and with the transverse perforations 18. The disks 13, 14 are united adjacent the tooth 15, the space between the disks being sufficient to permit them to receive the recessed portion 3 of the saw blade between them. The disks are each formed with central perforations and with arcuate slots corresponding to those of the saw blade so that when the disks are seated in the recessed portions of the blade, as shown in Figs. 1 and 3, the slots and central openings of the disks will register with those of the saw blade. The slots of the disks are shorter than those of the saw blade and keys 19, of metal filling or the like, connect the slotted portions of one disk with those of the other disk and pass through the slots of the saw blade. The keys 19 are soldered or otherwise secured in the slotted portions of the disks but are movable through the slotted portions of the blade. The keys are applied in place after the disks are disposed in engagement with the saw blade.

When the disks are so placed that the teeth 15 lie parallel with the saw teeth 2 or equidistant from those teeth the ends of the several keys 19 will be spaced away from the ends of their respective slots in the saw blade. The purpose of the keys is, then, to retain the disks in position and to limit the degree of oscillation of the same upon the pins 20 that connect them to the blade. It is intended that the several keys will be of such length as to engage with the ends of the slots in the saw blade and arrest movement of the disks in either direction when the raker tooth has reached its working position and before the prongs 16, 17 can come in contact with the saw teeth 2. The working position will be determined in sharpening and setting the saw. Contact of the prongs 16, 17 with the saw teeth would dull the prongs. The oscillating teeth will wear substantially as the teeth 2 wear through use of the saw. The transverse slots 18 in the teeth 15 facilitate gumming of the same as they wear down; such gumming being more easily had than if the teeth were formed of one solid piece. As the saw is moved back and forth, in use, the raker teeth will rake the saw dust from the cut made by the regular teeth 2 thus facilitating the operation and increasing the efficiency of the saw; only one prong of the raker tooth coming in contact with the bottom of the cut and thus reducing the friction. Perforations 21 in the disks permit lubrication of the parts.

What is claimed is:—

1. In a saw, a recessed blade, the recessed portions of said blade being slotted and perforated, oscillating teeth, operatively disposed in the recessed portions of said blade, and means connecting said oscillating teeth and the slotted portions of the saw blade for securing said members together and for determining the degree of movement of said teeth in each direction.

2. In a saw, a recessed blade, the recessed portions of said blade being slotted and perforated, oscillating teeth operatively disposed in the recessed portions of said blade, pivotal connection between said members, said oscillating teeth being formed with slots adapted to aline with the slots of said blade but smaller than the blade slots, and keys connecting the slots of said oscillating teeth with the slots of said blade whereby the degree of movement of said teeth in each direction is limited.

3. In a saw, a recessed blade provided with stationary teeth, the recessed portions of said blade being perforated and formed with arcuate slots, spaced disks adapted for disposal in the recessed portions of said blade, said disks being perforated and formed with arcuate slots adapted to aline with the arcuate slots of said blade, the slots of said disks being shorter than those of the blade, a pivot pin connecting said disks and blade, keys connecting the slots of said disks with those of said blade whereby the oscillating movement of said disks is defined, and raker teeth carried by said disks and adapted for movement therewith between the stationary teeth of the blade.

4. In a saw, a recessed blade provided with stationary teeth, the recessed portions of said blade being perforated and formed with arcuate slots, spaced connected disks adapted for disposal in the recessed portions of said blade, said disks being perforated and formed with arcuate slots adapted to aline with the arcuate slots of said blade, the slots of said disks being shorter than those of the blade, a pivot pin connecting the perforated portions of said disks with those of the blade, keys connecting the slots of said disks with those of the blade whereby the oscillating movement of said disks is controlled, and slotted raker teeth carried by said disks and depending between the stationary teeth of the saw blade for oscillating movement with said disks.

In testimony that I claim the foregoing as my own I have hereto affixed my signature in the presence of two subscribing witnesses.

ERIC BECK.

Witnesses:
W. C. AUSSING,
A. E. GRAHAM.